(12) United States Patent
Cabrit et al.

(10) Patent No.: US 10,843,370 B2
(45) Date of Patent: Nov. 24, 2020

(54) SAWMILL CARRIAGE ASSEMBLY (71) Applicant: Norwood Industries Inc., Ontario (CA)

(72) Inventors: Sebastien Cabrit, Ontario (CA); Ashlynne Dale, Ontario (CA); Brian Shellswell, Ontario (CA)

(73) Assignee: Norwood Industries Inc., Ontario (CA)

( * ) Notice: Subject to any disclaimer, the term of this patent is extended or adjusted under 35 U.S.C. 154(b) by 24 days.

(21) Appl. No.: 16/000,247

(22) Filed: Jun. 5, 2018

(65) Prior Publication Data

US 2018/0345524 A1    Dec. 6, 2018

(30) Foreign Application Priority Data

Jun. 6, 2017  (CA) ...................... 2969794

(51) Int. Cl.
| | |
|---|---|
| *B27B 15/02* | (2006.01) |
| *B27B 13/02* | (2006.01) |
| *B27B 29/08* | (2006.01) |
| *B27B 13/10* | (2006.01) |
| *B23D 55/02* | (2006.01) |

(Continued)

(52) U.S. Cl.
CPC .............. *B27B 29/08* (2013.01); *B23D 55/02* (2013.01); *B27B 13/02* (2013.01); *B27B 13/10* (2013.01); *B27B 13/12* (2013.01); *B27B 13/16* (2013.01); *B27B 15/02* (2013.01)

(58) Field of Classification Search
CPC ......... B27B 29/08; B27B 13/02; B27B 13/10; B27B 13/12; B27B 13/16; B27B 15/02; B23D 55/02

USPC ............ 83/794–795; 144/376–378; 211/162; 280/43.1–43.24, 47.24
See application file for complete search history.

(56) References Cited

U.S. PATENT DOCUMENTS

| | | | |
|---|---|---|---|
| 451,165 A | 4/1891 | Zimmerman | |
| 706,726 A * | 8/1902 | Comstock | A01B 35/08 172/344 |
| 959,899 A | 5/1910 | Sweet | |

(Continued)

FOREIGN PATENT DOCUMENTS

| | | |
|---|---|---|
| AU | 646333 B2 | 12/1982 |
| CA | 1159342 A | 12/1983 |

(Continued)

OTHER PUBLICATIONS https://web.archive.org/web/20170319182848/http://woodlandmills.ca:80/us/product/hm130-protable-sawmill; Archived webpage; archived Mar. 19, 2017.

(Continued)

*Primary Examiner* — Kenneth E Peterson
*Assistant Examiner* — Nhat Chieu Q Do
(74) *Attorney, Agent, or Firm* — Calfee, Halter & Griswold LLP (57) ABSTRACT

A method for constructing a lower section of a sawmill carriage assembly comprises holding structural components between a pair of metal plates, and affixing the plates and the structural components together. The structural components may include wheels that guide the sawhead in linear movement along a track on a sawmill bed, to which the carriage base is attached. The structural components may also include a track cleaning system disposed between the metal plates. The track cleaning system maintains optimal track conditions.

16 Claims, 8 Drawing Sheets

(51) Int. Cl.
*B27B 13/12* (2006.01)
*B27B 13/16* (2006.01)

(56) References Cited

U.S. PATENT DOCUMENTS

| | | | | |
|---|---|---|---|---|
| 1,255,484 | A | * | 2/1918 | Stephens ................. B62B 1/264 414/457 |
| 2,131,029 | A | * | 9/1938 | Green ....................... A47F 3/08 40/524 |
| 2,470,637 | A | * | 5/1949 | Olson ....................... B62B 1/24 280/43.17 |
| 2,664,598 | A | * | 1/1954 | Greig ................... E06B 3/4636 49/420 |
| 4,392,520 | A | * | 7/1983 | Wrightman ............... B27F 1/08 144/136.9 |
| 4,930,386 | A | | 6/1990 | Laskowski et al. |
| 5,119,872 | A | * | 6/1992 | Engebretson ......... E05D 15/066 16/105 |
| 8,276,493 | B2 | * | 10/2012 | Dale ...................... B23D 55/02 83/788 |
| 2003/0197344 | A1 | * | 10/2003 | Chung ................... B62K 3/002 280/244 |

FOREIGN PATENT DOCUMENTS

| | | | | |
|---|---|---|---|---|
| CA | 2488216 | C | | 5/2006 |
| CH | 288809 | A | * | 2/1953 ............. B27B 15/02 |
| CH | 288809 | A | | 2/1953 |
| CN | 202292914 | U | | 7/2012 |
| CN | 202989713 | U | | 6/2013 |
| CN | 203125626 | U | | 8/2013 |
| CN | 103233401 | B | | 9/2015 |
| CN | 103866661 | B | | 9/2015 |
| EP | 2529870 | A1 | | 12/2012 |
| FR | 993369 | A | * | 10/1951 ............... B23Q 1/26 |
| FR | 1034229 | A | * | 7/1953 ............. B27B 15/02 |
| RO | 115235 | B | | 12/1999 |
| RO | 120464 | B1 | | 2/2006 |
| RU | 2257997 | C2 | | 3/2004 |

OTHER PUBLICATIONS

Office Action in Canadian Appl. No. 2,969,794 dated Sep. 26, 2017.
Office Action in Canadian Appl. No. 2,969,794 dated Mar. 28, 2018.
Office Action in Canadian Appl. No. 2,969,794 dated Aug. 28, 2018.
Search Report from European Patent Application No. 18176350.9 dated Oct. 23, 2018.

* cited by examiner

SAWMILL CARRIAGE ASSEMBLY

CROSS-REFERENCE TO RELATED APPLICATION

This application claims the benefit of and priority to Canadian Patent Application No. 2,969,794, filed Jun. 6, 2017, under the title SAWMILL CARRIAGE ASSEMBLY, the entire disclosure of which is incorporated herein by reference.

FIELD OF THE INVENTION

The present invention relates to a method for making a lower section of a sawmill carriage assembly used in sawmills.

BACKGROUND OF THE INVENTION

A sawmill carriage assembly is a component of a sawmill. The sawmill carriage assembly is moveably fixed to a sawmill bed. The sawmill bed receives a log, such that the log extends longitudinally parallel to the length of the sawmill bed. The sawmill carriage assembly moves along the length of bed, and thus the length of the log, requiring horizontal movement of the sawhead relative to the sawmill bed. The sawmill carriage assembly also has vertical guide rods attached to the sawmill bed, for supporting a saw head, a saw engine, a saw controller, and a saw lubricator apparatus, and allowing the saw head to move upwardly and downwardly. The sawhead has the saw mounted therein, and the saw is used to mill the log into lumber.

The vertical rods typically have low-friction surfaces that allow smooth vertical movement of the sawhead. Previous sawmill carriage assemblies are made by attaching horizontal bars to vertical bars by welding. To further reinforce the weld, additional bars are welded to both the horizontal and vertical bars, at an acute angle. See, for example, Canadian patent no. 2488216. Thus carriage assemblies are typically relatively large, complex and heavy structures constructed of heavy gauge steel utilizing multiple precision welds. The requirement for heavy gauge steel and precision welds, adds costs, which is undesirable.

SUMMARY OF THE INVENTION

According to one aspect of the invention, a method for manufacturing sawmill carriage assemblies is provided.

According to another aspect of the invention, sawmill carriage assemblies manufactured by the method is provided.

Two or more plates of rigid materials may be laminated for making the lower frame of sawmill carriage assemblies. Internal structural members are gripped between the two or more plates. In some embodiments, the plates are metal and the internal structural members are held together using bolts and nuts. In some embodiments, the plates of metal and the internal structural members are held together using rivets.

In some embodiments, the internal structural members may comprise horizontal guides. In some embodiments, the internal structural members may further comprise vertical guide rods. In some embodiments, the structural members may further comprise a track cleaning system.

In some embodiments, the horizontal guide may be one piece, having two wheels disposed along the length of the sawmill bed. In some embodiments, more wheels may be disposed between the two longitudinal ends. In preferred embodiments, one wheel is disposed on each longitudinal end of the guides.

In some embodiments, each horizontal guide may comprise multiple separate carriage wheel assemblies, each carriage wheel assembly having a wheel. Each carriage wheel assembly is affixed between the two plates with the axles of the wheels perpendicular to the plates.

When the sawmill carriage assembly is fully assembled and installed on the sawmill bed, the wheels rest on the sawmill bed so that the sawmill carriage assembly may easily move along the length of the sawmill bed by rotation of the wheels. In preferred embodiments, the sawmill bed is provided with a track.

In some embodiments, the track cleaning system may be integrated with the horizontal guides or some of the carriage wheel assemblies.

The track cleaning system may comprise a holder for a track cleaning component. The track cleaning component may be made of felt, brushes, or similar materials. The track cleaning component may be a single solid piece or may have brush configured at its end in contact with the sawmill bed. In some embodiments, the track cleaning system may be separate component that is affixed between the two plates. A sawmill carriage assembly may comprise multiple track cleaning systems.

The track cleaning system works as it moves along the track to pick up or displace any debris that the track has collected. The track cleaning component may contain grease to allow simultaneous track greasing as the carriage moves along the track, promoting gentle carriage movement. The track cleaning component may be replaceable.

Due to internal wheel placement, contact between the wheels with external dirt and debris is minimized. As a result of this and the built-in track cleaning system, track conditions are maintained, for safety and ease of use. These features also reduce the need for other cleaning devices and materials.

BRIEF DESCRIPTION OF THE DRAWINGS

Reference will now be made, by way of example, to the accompanying drawings which show example embodiments of the present application, and in which.

DETAILED DESCRIPTION OF THE PREFERRED EMBODIMENTS

The following detailed description of the embodiment(s) is merely exemplary in nature and is in no way intended to limit the invention, its application, or uses. As used herein, the term "exemplary" means "serving as an example, instance, or illustration," and should not be construed as preferred or advantageous over other configurations disclosed herein.

An embodiment of the present invention will now be described as shown in FIGS. 1-7.

Figure 1:
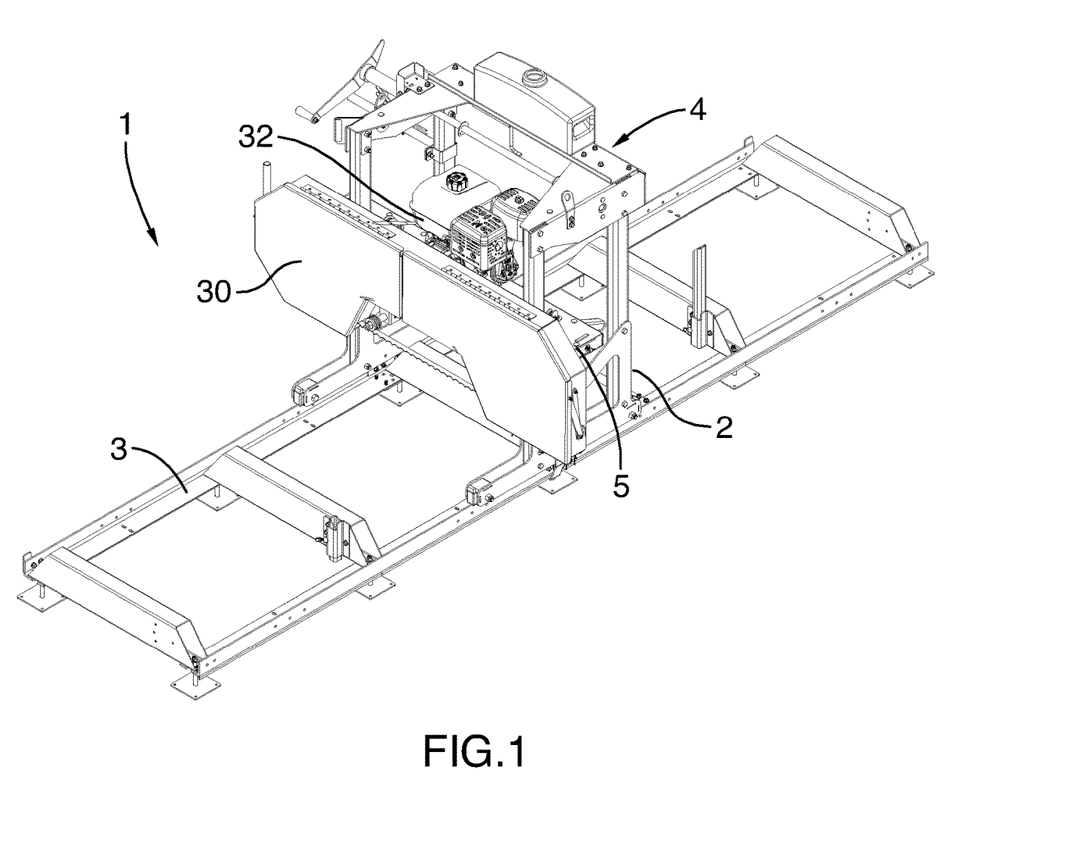
FIG. 1 is a perspective view of a portable sawmill of the present invention.

As shown in FIG. 1, the sawmill assembly 1 is composed of sawmill head 5, an engine 32, a band saw and band saw cover 30, all of which is mounted on sawmill carriage assembly 4. The sawmill carriage assembly 4 is mounted to sawmill bed 3. The sawmill carriage assembly 4 comprises at least two lower section 2, one on each side of the longitudinal centerline of the sawmill bed 3.

Figure 2:
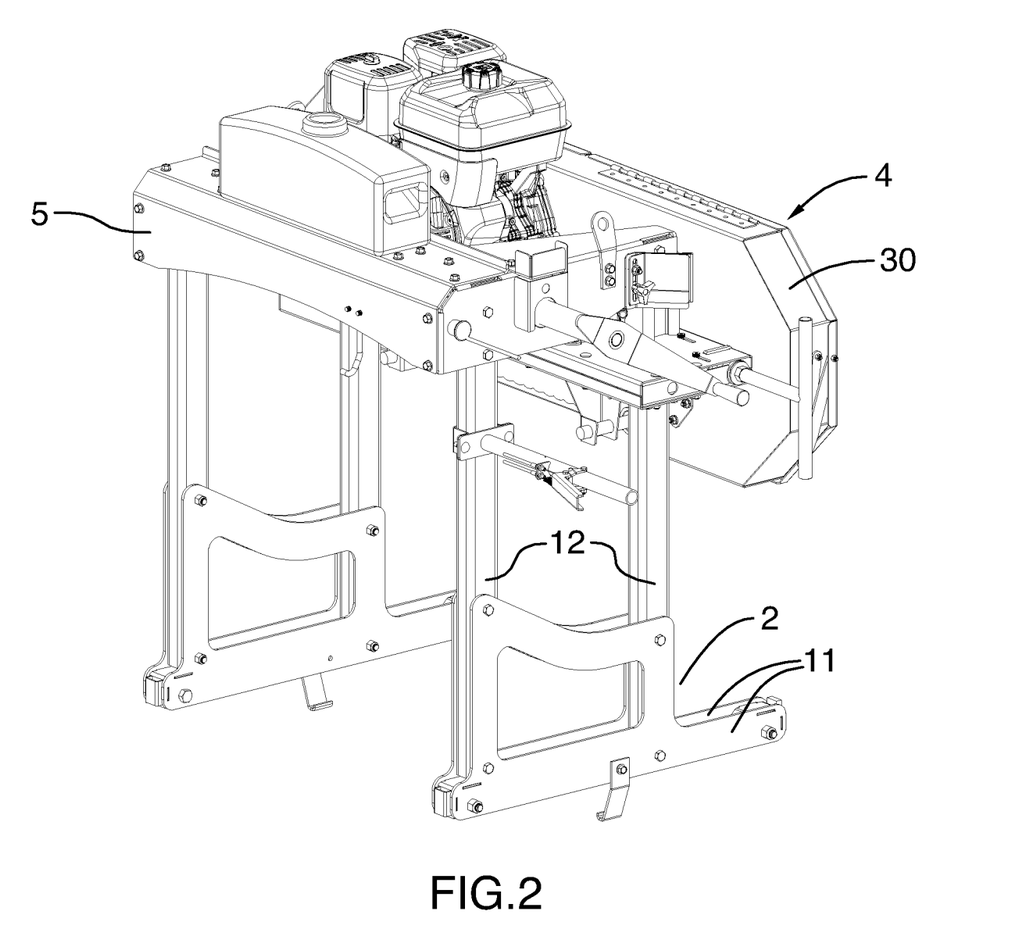
FIG. 2 is a perspective view of a sawmill carriage assembly of the present invention.

As shown in FIG. 2, the upper section of the carriage is built to hold the sawmill head 5, while the lower section is built to slideably engage the sawmill bed. The lower section 2 of the sawmill carriage assembly 4 comprises at least one vertical rod 12 and two plates 11. The structural components are held between two plates 11.

Figure 3:
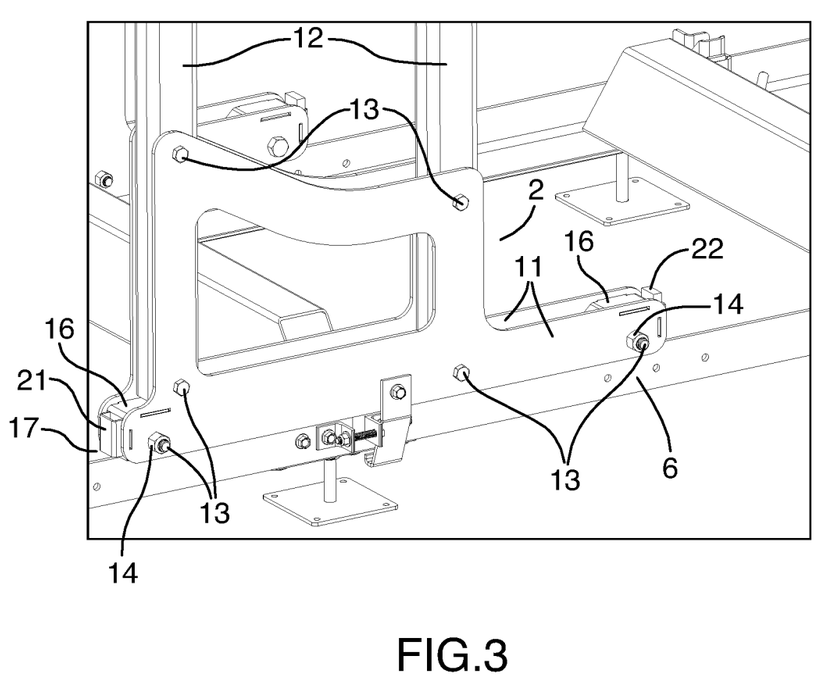
FIG. 3 is a perspective view of the lower section of the sawmill carriage assembly of FIG. 2, wherein the sawmill carriage assembly is mounted on a sawmill bed.

FIG. 3 shows the sawmill carriage assembly 4 mounted on the sawmill bed 3. The two plates 11 are disposed on two opposing sides of the vertical rod 12. One plate is farther away from the longitudinal centerline of the sawmill bed 3 than the other. The plates 11 may be made of any suitable material known in the field. In some examples, the plates may be made of metal. In some examples, the plates may be made of reinforced resin. In preferred examples, the plates are made of steel, stainless steel, aluminum, or metal alloys.

The plates 11 may hold the vertical rod 12 in place by any suitable means known in the field. In some embodiments, the plates 11 may hold the vertical rod 12 by bolts 13 and nuts 14, as shown in FIG. 3. In some embodiments, the plates 11 may hold the vertical rod 12 in place by rivet. In some embodiments, the plates 11 may hold the vertical rod 12 in place by adhesive, a weld, or the like.

At least one carriage wheel assembly 16 may also be disposed between the plates 12. The carriage wheel assembly 16 may be disposed on the track 6 of the sawmill bed 3 when the sawmill carriage assembly is disposed on the sawmill bed 3.

The carriage wheel assembly 16 may be disposed anywhere along the moving direction of the sawmill carriage assembly 4. In preferred embodiments, there are at least two carriage wheel assemblies 16, each disposed at or close to one end of the lower section of the sawmill carriage assembly 4. The number of carriage wheel assemblies may be changed depending on the weight of the sawmill carriage assembly 4 to provide better support and smooth movement, and to reduce pressure on the carriage wheel assemblies 16.

The carriage wheel assembly 16 may be attached to the plates 11 by any suitable means known in the field. For example, FIG. 3 shows that nuts 14 and bolts 13 are used to affix the posts 12 to the plates 11. In some examples, rivets may be used to affix the carriage wheel assembly 16 to the plates 11. In some examples, the carriage wheel assembly 16 may be affixed to the plates by adhesives, a weld, or the like.

The carriage wheel assembly 16 may be made of any suitable material known in the field. In some embodiments, metal may be used to make the carrier wheel assembly 16. In some embodiments, polymers, plastics, or reinforced resin may be used to make the carrier wheel assembly 16. In preferred embodiments, the carriage wheel assembly is made of steel.

At least one track cleaning system 17 may also be disposed between the plates 11. The track cleaning system comprises at least a holder 21 and a track cleaning component 22.

The track cleaning system 17 may be disposed anywhere along the moving direction of the sawmill carriage assembly 4 on the sawmill bed 3 in operation. In preferred embodiments, there are two track cleaning systems 12, each disposed at one end of the lower section 2 in the moving directions of the sawmill carriage assembly 4. By this arrangement, when the sawmill carriage assembly 4 is moved in either direction, the track cleaning system 17 cleans the track for the rest of the sawmill carriage assembly 4.

In some embodiments, the holder 21 is integrated with the carriage wheel assembly 16. In some examples, the holder 21 may be cast in one piece with the carriage wheel assembly 16. In some examples, the holder 21 may be bolted or riveted to the carriage wheel assembly 16 or glued to the carriage wheel assembly 16 using adhesives.

In some examples, the holder 21 may be separate from the carriage wheel assembly 16 and the holder 21 is affixed directly to the plates 11 by any suitable means in the field. In some examples, the holder 21 may be bolted or riveted to the plates 11 or glued to the plates 11 using adhesives.

The holder 21 may be made of any suitable material known in the field. In some embodiments, the holder 21 is made of metal. In some embodiments, the holder 21 is made of plastic. The holder may be made by any suitable means known in the field.

A track cleaning component 22 may be disposed within the holder 21. The track cleaning component 22 may be held in the holder by any suitable means in the field. In some examples, the track cleaning component 22 may have rough outer surfaces so that it stays in the holder 21 by friction. In some examples, the track cleaning component 22 may have adhesives applied to at least one of its surfaces to stick to the interior of the holder 21. In preferred examples, the adhesive may be a non-setting adhesive. In some examples, the holder 21 may be configured with an inner projection to push the track cleaning component 22 against an interior surface of the holder 21 to hold the track cleaning component in place. The holder 21 may be shaped to optimize the accommodation of the track cleaning component 22.

The track cleaning component 22 may be made of any suitable materials known in the field. In some embodiments, the track cleaning component 22 is made of felt. The felt may be soaked in oil to allow simultaneous lubrication of the track. In some embodiments, the track cleaning component 22 may have a brush configured where it interacts with the sawmill bed 3. The brush may be made of metal, plastic or rubber.

Figure 4:
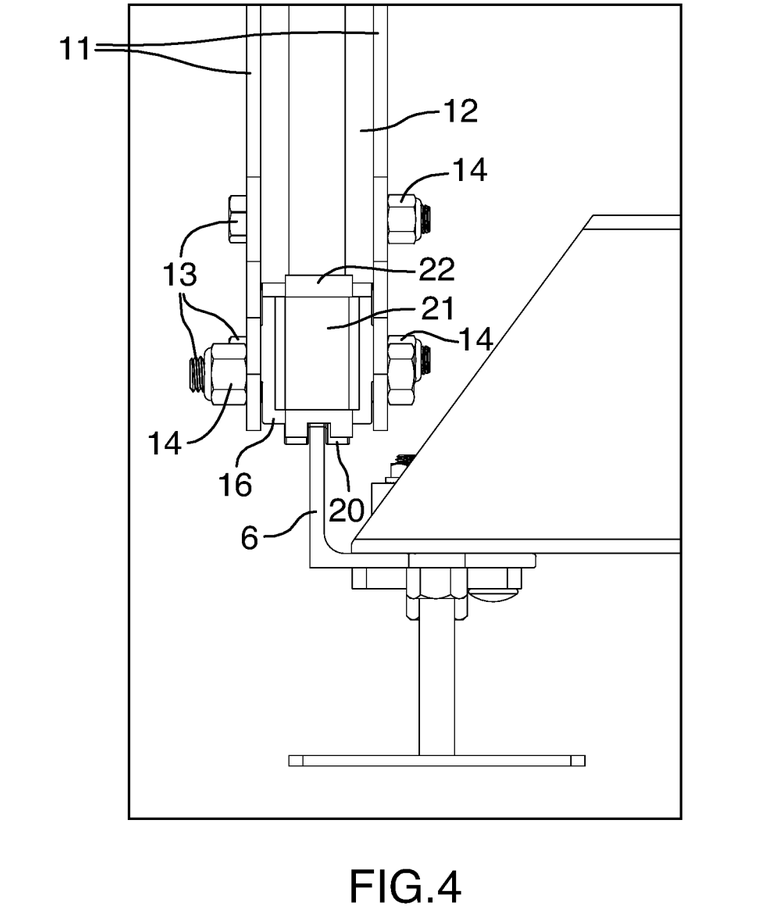
FIG. 4 is a front view of the lower section of a sawmill carriage assembly.

FIG. 4 shows the position of the track cleaning system 17 relative to the sawmill bed 3 when the sawmill carriage assembly 4 is mounted on the sawmill bed 3. The track cleaning component 22 is disposed above the track 6 of the sawmill bed 3. In some embodiments, the bottom of the track cleaning component 22 is configured with a recess so that the bottom of the track cleaning component 22 encloses the top and upper portions of the two sides of the track 6. In some embodiments, the recess is configured in the middle of the bottom of the track cleaning component 22.

FIG. 4 also shows that the wheel 20 resting on the track when the sawmill carriage assembly 4 is mounted on the sawmill bed 3.

Figure 5:
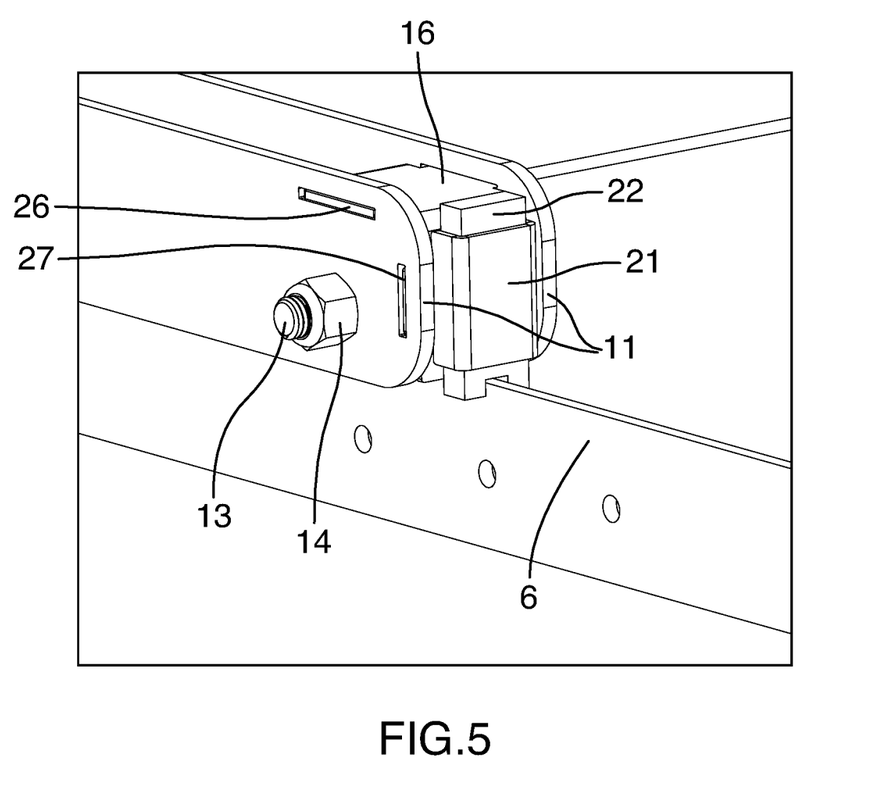
FIG. 5 is a front perspective view of a carriage wheel assembly.

FIG. 5 shows the position of the track cleaning component 22 relative to the track 6 of the sawmill bed 3. FIG. 5 also shows slots 26 and 27 configured in the plates 11.

Figure 6:
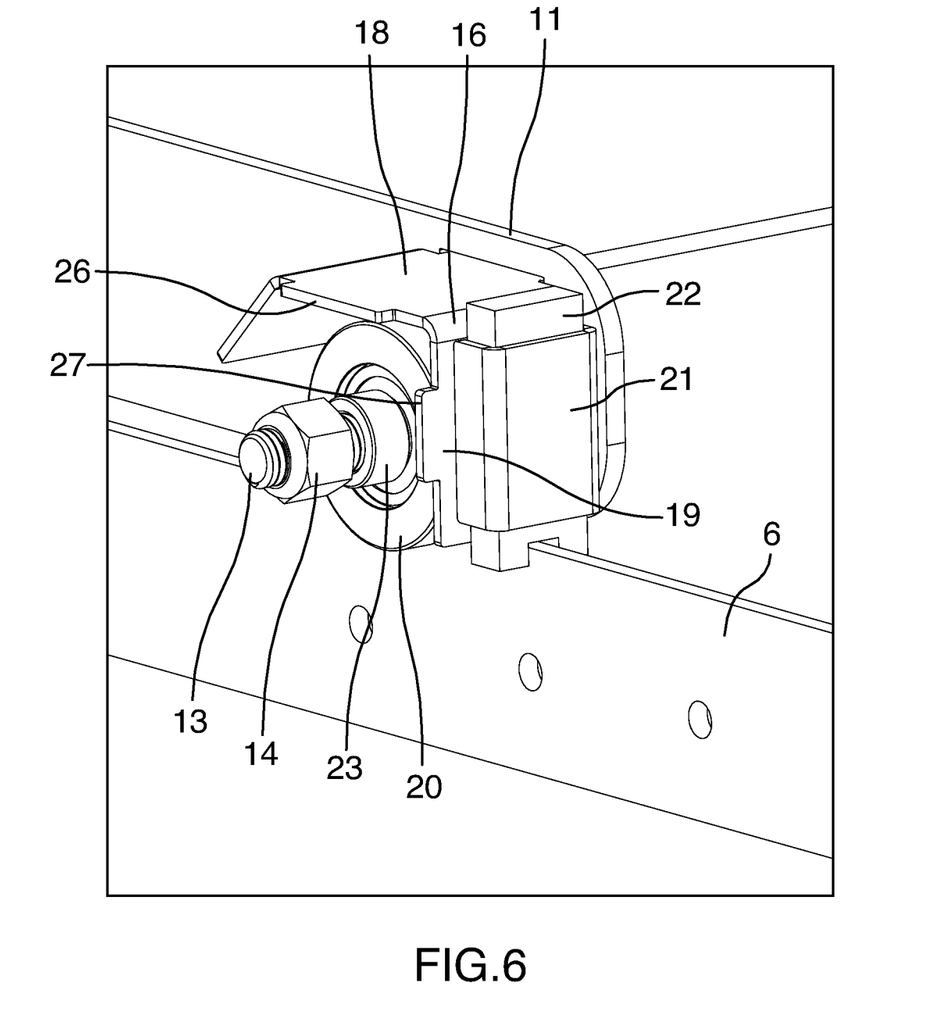
FIG. 6 is a sectioned view of the carriage wheel assembly.

FIG. 6 shows a section view of the wheel carrier assembly 16. In this particular embodiment, one carriage wheel 20 is seen to be held in place by nut 14 and bolt 13, as well as a wheel washer 23, which keeps the wheel away from plate 11. In this configuration, the bolt 13 used to hold the plates 11 together also functions as the axle of the wheel 20. It is understood that the axle of the wheel 20 may be different from the bolt 13 and nut 14 used to hold the plates 11 together.

In some embodiments, the carrier wheel assembly 16 provides cover 18 to wheel 20 to protect the wheel 20 from dust and debris, for example, sawdust from the sawing operation. In preferred embodiment, the cover 18 extends beyond the wheel and bends downwardly. In preferred embodiments, the cover 18 has projections that extend into the slots 26 for attachment to the plates 11.

In some embodiments, the carrier wheel assembly 16 is provided with a front plate 19. In some embodiments, the holder 21 is integrated with the carriage wheel assembly by affixing to the front plate 19. In some embodiments, the front plate 19 is provided with projections that extend into slot 27 configured in the plate 11. In preferred embodiments, each plate 11 is configured with a slot 27 to receive a projection of the front plate 19.

The holder 21 may be bolted or riveted to the front plate 19 or glued to the front plate 19 using adhesives. In preferred embodiments, the holder 21 is cast in one piece with the front plate 19.

Figure 7:
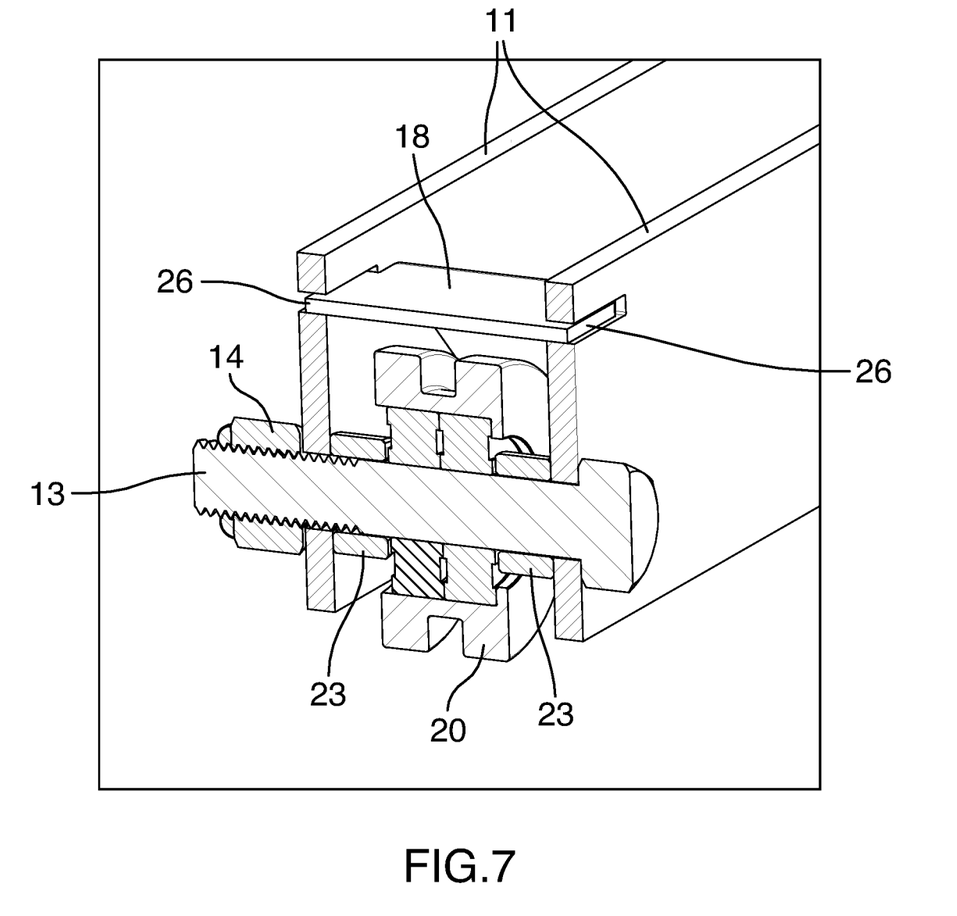
FIG. 7 is a cross-section view of the carriage wheel assembly of FIG. 6.

FIG. 7 is a section view the carriage wheel assembly 16 of FIG. 6. In the embodiment shown, the bolt 13 that contributes to holding the plates 11 and the carriage wheel assembly 16 together also functions as the axle of the carriage wheel 20. It is understood that the axle of the carriage wheel 20 may be different from the bolt 13.

Wheel washer 23 is used to hold the wheel 20 in place. In preferred embodiments, one wheel washers 23 is disposed on each side of the wheel 20 to hold the wheel 20 in the center between the two plates 11. In preferred embodiments, an annular groove is disposed on the rolling surface of the wheel 20 to receive a portion of the track 6. In preferred embodiments, the groove is configured in the middle of the rolling surface.

FIG. 7 also shows that there is a slot 26 on each of the plates 11.

Figure 8:
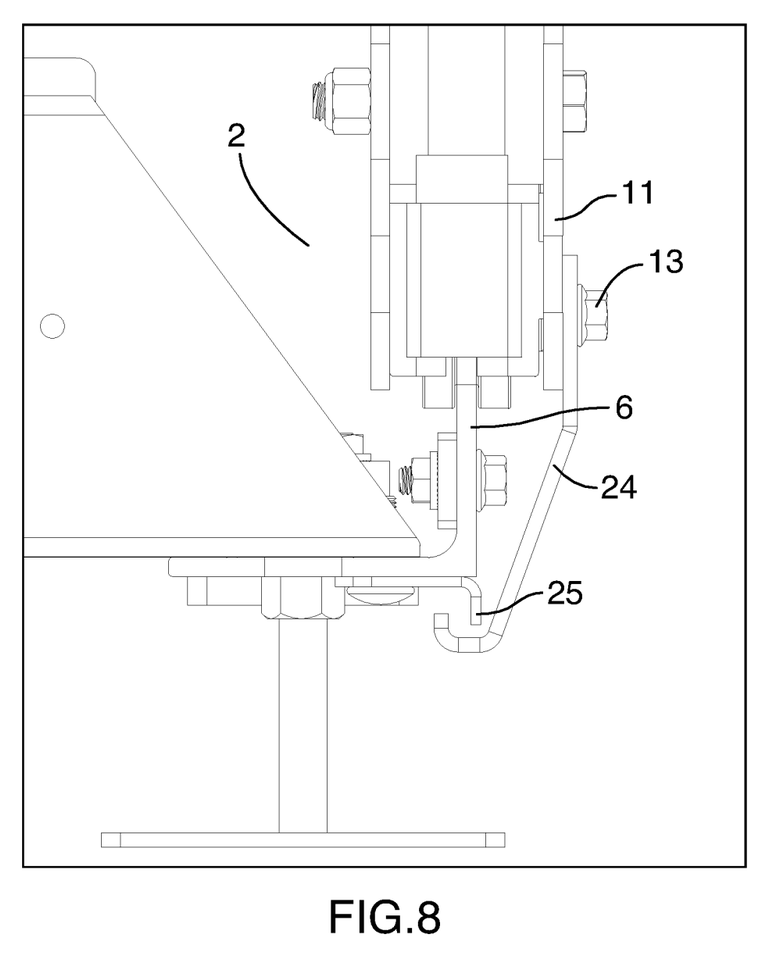
FIG. 8 is a front view of another embodiment of the lower section of a sawmill carriage assembly.

FIG. 8 shows another embodiment of the lower section 2 of the sawmill carriage assembly 4. In this embodiment, a part 25 is provided that has a portion extending downwardly substantially parallel to the sides of track 6.

A control bar 24 is also provided in the lower section 2 on the side of the lower section 2 away from longitudinal centerline of the sawmill bed 3. The upper end of control bar 24 may be fixedly or removably attached to the plate 11. In preferred embodiment, a hole is configured in the upper end of control bar 24 to allow the bolt 13 through. Thus, when the bolt 13 holds the lower section 2 together, control bar 24 is also affixed to the lower section 2. Control bar 24 extends downwardly, with at least a portion extending inwardly toward the track 6.

A hook-like structure is provided at the lower end of control bar 24. The top of the free end of the hook-like structure is higher than the lowest point of control rail 25. In normal operation, control bar 24 and control rail 25 are not in contact. However, if the sawmill carriage assembly 4 tips over to one side, control bar 24 and control rail 25 on the other side of the sawmill carriage assembly 4 interact and prevent the sawmill carriage assembly 4 from tipping further.

While but a single embodiment of the present invention has been herein shown and described, it will be understood that various changes may be made without departing from the scope of the invention.

As one example, reinforcing tubes can be provided between the metal plates for stiffening the carriage, and/or the plates could be stamped with integral stiffening ribs (not shown) to similar effect. Alternatively, non-tubular stamped metal inserts could be utilized (also not shown), as could solid bars. Moreover, whereas the reinforcing members illustrated herein are of rectangular cross-section, other cross-sections, such as trapezoidal and round could readily be utilized. The location, configuration and quantity of reinforcing members could vary.

Further, whereas bolts, both in nut and bolt assemblies and alone are utilized in the preferred embodiment illustrated to hold the plates, guide receivers and reinforcing tubes together, other fastening mechanisms could also be used. Without limitation, appropriate threaded apertures could, for example, be formed in one or more of the plates and/or in the mounting flanges to receive bolts, thereby to obviate the need for nuts.

The present invention provides several advantages. First, the structural elements perform multiple functions simultaneously; they strengthen the laminate structure while also cleaning the track, rolling the carriage, and maintaining the carriage on the track. For example, the roller track wheel and cleaner now also become structural components, reinforcing the structure of the lower carriage. Vertical guides 12 and plates 11 combine to act as reinforcing structures to give the carriage rigidity and stability. Overall, the carriage serves both as guides for vertical movement, but are also structural.

Unlike the prior art, the weight of carriage is directly over rail, rather than offset, thus less steel is required to construct the sawmill, and the sawmill is better balanced and better centered.

Furthermore, the carriage comprises a laminated structure which is strong and rigid, and yet lightweight. This allows the carriage to be constructed out of relatively lightweight materials, as compared to carriage assemblies of the prior art. This reduces fabrication and shipping costs.

The components of the carriage assembly, and indeed, the entire sawmill, can be packaged in kit form and shipped to a purchaser for assembly. This can further lessen costs, rendering the kit product an attractive option to average people seeking to purchase a personal, sawmill. This is more difficult using the methods of the prior art, which require precision welding.

There is no roller system required below the rail, and less of the carriage structure extends outside of rail, thus there is less interference with debris, body parts (feet) of the operator, and the like.

Unless defined otherwise, all technical and scientific terms used herein are intended to have the same meaning as commonly understood by one of ordinary skill in the art.

The scope of the claims should not be limited by the preferred embodiments set forth in the examples, but should be given the broadest interpretation consistent with the description as a whole.

What is claimed is:

1. A method for constructing a sawmill comprising a carriage assembly, a lower section of the carriage assembly comprising structural components, the structural components include at least two vertical bars and at least two wheel carriage assemblies, the method comprising:

applying opposing forces to the at least two vertical bars of the structural components using two or more vertically extending rigid plates to grip the at least two vertical bars between the two or more vertically extending rigid plates;

applying opposing forces to a wheel carriage frame of each of the at least two wheel carriage assemblies using the two or more vertically extending rigid plates to grip the at least two wheel carriage assemblies between the two or more vertically extending rigid plates;

affixing the two or more vertically extending rigid plates and the structural components together; and mounting a sawmill assembly to an upper section of the at least two vertical bars;

wherein:
   a wheel is disposed in the wheel carriage frame of each of the at least two wheel carriage assemblies; and
   said at least two vertical bars are configured to support an upper section of the sawmill carriage.

2. The method of claim 1, wherein the two or more rigid plates are made of steel.

3. The method of claim 1, wherein the affixing is by bolts and nuts, rivets or a combination thereof.

4. The method of claim 1, wherein the at least two wheel carriage assemblies comprise a first wheel carriage assembly and a second wheel carriage assembly, wherein the first wheel carriage assembly is disposed toward a front end of the lower section and the second wheel carriage assembly is disposed toward a rear end of the lower section.

5. The method of claim 1, wherein each of the wheel carriage assemblies comprises a cover for the wheel.

6. The method of claim 1, wherein each of the wheels has an annular groove on its outer surface, said annular groove configured to receive a track therein.

7. The method of claim 1, wherein the structural components further comprise a track cleaning system at the bottom of the lower section held to be in contact with a track of a sawmill bed.

8. The method of claim 7, wherein the track cleaning system comprises a holder and a track cleaning component disposed within the holder.

9. The method of claim 8, wherein the track cleaning component is made of felt.

10. The method of claim 7, wherein the track cleaning component is configured with a recess at its bottom.

11. The method of claim 7, wherein the track cleaning system is fixed to each of the at least two wheel carriage assemblies.

12. The method of claim 7, wherein the track cleaning system is disposed at a front end of the lower section.

13. The method of claim 1, wherein the sawmill assembly supports and/or guides one or more of a saw head, a saw engine, a saw controller, and a saw lubricator apparatus.

14. A sawmill comprising a lower carriage assembly, the lower carriage assembly comprising:
   two or more vertically extending rigid plates; and
   structural components, comprising:
      at least two vertical bars; and
      at least two wheel carriage assemblies, each including a wheel carriage frame and a wheel disposed in the wheel carriage frame; and
   a sawmill assembly mounted on an upper section of the at least two vertical bars;
wherein:
   the two or more vertically extending rigid plates apply opposing forces to the at least two vertical bars to grip the at least two vertical bars between the two or more vertically extending rigid plates;
   the two or more vertically extending rigid plates apply opposing forces to each of the wheel carriage frames to grip the at least two wheel carriage assemblies between the two or more vertically extending rigid plates; and
   the two or more vertically extending rigid plates and the structural components are affixed together.

15. The sawmill of claim 14, further comprising a control bar, said control bar extending from said sawmill carriage assembly to proximal to a sawmill bed track, said control bar to prevent destabilization of said sawmill carriage assembly in relation to said track.

16. The sawmill of claim 15, wherein said control bar further comprises a hook extending partially around a bottom of said track.

* * * * *